United States Patent [19]

Kaneko et al.

[11] Patent Number: 4,734,767

[45] Date of Patent: Mar. 29, 1988

[54] ENCODER CAPABLE OF FAITHFULLY AND ADAPTIVELY ENCODING A MOVING IMAGE

[75] Inventors: Masahide Kaneko, Kanagawa; Mutsumi Ohta, Tokyo; Kiichi Matsuda; Yoichi Kato, both of Kanagawa, all of Japan

[73] Assignees: Kokusai Denshin Denwa Co., Ltd.; NEC Corporation; Fujitsu Limited; Nippon Telegraph and Telephone Corporation, all of Japan

[21] Appl. No.: 29,565

[22] Filed: Mar. 24, 1987

[30] Foreign Application Priority Data

Mar. 24, 1986 [JP] Japan .................................. 61-66526

[51] Int. Cl.$^4$ .............................................. H04N 7/12
[52] U.S. Cl. ...................................... 358/133; 358/135
[58] Field of Search ............... 358/136, 135, 133, 260, 358/280, 105; 364/826; 382/43, 56

[56] References Cited

U.S. PATENT DOCUMENTS 3,984,626 10/1976 Mounts et al. ...................... 358/135
4,281,344 7/1981 Mounts et al. ...................... 358/136
4,591,909 5/1986 Kuroda et al. ...................... 358/136

Primary Examiner—James J. Groody
Assistant Examiner—Victor R. Kostak
Attorney, Agent, or Firm—Sughrue, Mion, Zinn, Macpeak, and Seas

[57] ABSTRACT

In an encoder responsive to a sequence of coefficient blocks each of which is composed of a plurality of orthogonal transform coefficients subjected to predictive encoding and orthogonal transform, the coefficient blocks are classified by a classification circuit (55) into a plurality of classes to produce a control signal (CONT) representative of the classes. A quantization unit (60), a code conversion unit (61), and a coefficient selection unit (62, 64) are controlled by the control signal to select quantization characteristics, code conversion characteristics, and coefficient selection characteristics. The quantization unit comprises a plurality of quantizers corresponding to the quantization characteristics while the code conversion unit and the coefficient selection unit comprise a plurality of code converters and a plurality of selection tables corresponding to the code conversion characteristics and the coefficient selection characteristics, respectively. Consequently, the coefficients are adaptively encoded into a reduced amount of encoded codes on encoding a moving image.

13 Claims, 44 Drawing Figures

| SCANNING ORDER | READOUT DATA SIGNALS | SCANNING ORDER | READOUT DATA SIGNALS | SCANNING ORDER | READOUT DATA SIGNALS |
|---|---|---|---|---|---|
| 1 | 1, 1, 0 | 1 | 1, 1, 0 | 1 | 1, 1, 1 |
| 2 | 1, 2, 0 | 2 | 2, 1, 0 | 2 | 1, 2, 0 |
| 3 | 1, 3, 0 | 3 | 3, 1, 0 | 3 | 2, 1, 1 |
| ⋮ | ⋮ | ⋮ | ⋮ | 4 | 1, 3, 0 |
| 8 | 1, 8, 1 | 8 | 8, 1, 1 | 5 | 2, 2, 0 |
| 9 | 2, 1, 0 | 9 | 1, 2, 0 | 6 | 3, 1, 1 |
| 10 | 2, 2, 0 | 10 | 2, 2, 0 | 7 | 1, 4, 0 |
| ⋮ | ⋮ | ⋮ | ⋮ | 8 | 2, 3, 0 |
|  |  |  |  | 9 | 3, 2, 0 |
|  |  |  |  | 10 | 4, 1, 1 |
|  |  |  |  | ⋮ | ⋮ |
| 63 | 8, 7, 0 | 63 | 7, 8, 0 | 63 | 8, 7, 1 |
| 64 | 8, 8, 2 | 64 | 8, 8, 2 | 64 | 8, 8, 2 |

FIG 15

| VERTICAL MAXIMUM ADDRESS \ HORIZONTAL MAXIMUM ADDRESS | 1) | 2) | 3) | 4) | 5) | 6) | 7) | 8) |
|---|---|---|---|---|---|---|---|---|
| 1) | 1 | 2 | 3 | 3 | 4 | 4 | 4 | 4 |
| 2) | 2 | 2 | 3 | 3 | 4 | 4 | 8 | 8 |
| 3) | 3 | 3 | 3 | 6 | 10 | 10 | 10 | 12 |
| 4) | 3 | 3 | 6 | 6 | 10 | 12 | 12 | 12 |
| 5) | 5 | 5 | 9 | 9 | 13 | 13 | 15 | 15 |
| 6) | 5 | 5 | 9 | 11 | 13 | 13 | 15 | 15 |
| 7) | 5 | 7 | 9 | 11 | 14 | 14 | 16 | 16 |
| 8) | 5 | 7 | 11 | 11 | 14 | 14 | 16 | 16 |

| Vertical Maximum Address \ Horizontal Maximum Address | 1) | 2) | 3) | 4) | 5) | 6) | 7) | 8) |
|---|---|---|---|---|---|---|---|---|
| 1) | 1,1 | 2,4 | 3,10 | 3,10 | 4,12 | 4,12 | 4,12 | 4,12 |
| 2) | 2,4 | 2,4 | 3,10 | 3,10 | 4,12 | 4,12 | 8,16 | 8,16 |
| 3) | 3,10 | 3,10 | 3,10 | 6,16 | 10,20 | 10,20 | 10,20 | 12,32 |
| 4) | 3,10 | 3,10 | 6,16 | 6,16 | 10,20 | 12,32 | 12,32 | 12,32 |
| 5) | 5,12 | 5,12 | 9,20 | 9,20 | 13,36 | 13,36 | 15,44 | 15,44 |
| 6) | 5,12 | 5,12 | 9,20 | 11,32 | 13,36 | 13,36 | 15,44 | 15,44 |
| 7) | 5,12 | 7,16 | 9,20 | 11,32 | 14,44 | 14,44 | 16,64 | 16,64 |
| 8) | 5,12 | 7,16 | 11,32 | 11,32 | 14,44 | 14,44 | 16,64 | 16,64 |

ENCODER CAPABLE OF FAITHFULLY AND ADAPTIVELY ENCODING A MOVING IMAGE

BACKGROUND OF THE INVENTION

This invention relates to an encoder for use in efficiently encoding a moving image into a sequence of encoded signals.

It is to be noted here that a moving image is divisible into a sequence of scenes which are placed within frames, respectively, and each of which consists of a series of picture elements. Such picture elements are given to an encoder in the form of picture element signals which are grouped into a sequence of picture frames corresponding to the scenes.

Heretofore, predictive encoding is known wherein a prediction error signal is produced by using correlation within each frame (intraframe correlation) or correlation between two successive ones of the picture frames (interframe correlation). However, the predictive encoding encounters a lot of difficulties due to a drastical variation of the picture element signals derived from the moving image. Such a drastical variation appears not only between the frames but also within a single frame locally. For example, the frames are classified into dynamically and stationarily changing frames. In addition, a single frame might often include coexistence of a stationary part, a dynamic part, a part having a strong correlation between two adjacent ones of the picture elements arranged along a vertical and/or a horizontal direction, and another part of a weak correlation between the picture elements. Under the circumstances, it is difficult to achieve a high efficiency by the use of the conventional predictive encoding.

Orthogonal transform encoding is also known wherein the picture element signals are transformed into orthogonal transform coefficients. The orthogonal transform coefficients may be recognized as frequency representations of the picture element signals between a high order or high frequency component and a low order or low frequency component. Such orthogonal transform serves to reduce energy of the high frequency component and can effectively encode the picture element signals so as to compress redundancy. With this orthogonal transform encoding, the moving image can not be encoded with a high efficiency because of such a drastical variation.

Alternatively, consideration has been directed to a method which carries out predictive encoding and orthogonal transform of a prediction error signal obtained by the predictive encoding and which will be called hybrid encoding or a hybrid method. However, various kinds of parameters must be selected and controlled so as to adaptively encode the moving image which is produced as the picture element signals accompanying the drastical variation. No disclosure has been made about a relationship among such parameters and about controlling them at all. In addition, troublesome control might be required, even if such parameters would be considered. Moreover, transmission must be carried out about a species and a change of the parameters used in encoding the moving image. This might result in an increase of an amount of information transmitted from such an encoder to a decoder.

In an article contributed by Wen-Hsiung Chen et al to "IEEE Transactions on Communications" (Vol. COM-25, No. 11, November 1977, pages 1285–1292) and entitled "Adaptive Coding of Images," a Cosine tranform adaptive coding system is disclosed wherein a sequence of digitized image signals is classified into groups by monitoring ac energy of sub-blocks. Quantization and coding might be carried out in consideration of the classification. However, no suggestion is made about selecting a sequence of transmission codes in relation to the classification.

SUMMARY OF THE INVENTION

It is an object of this invention to provide an encoder which carries out hybrid encoding of a moving image and which is capable of faithfully encoding the moving image even when a drastical variation takes place in the dynamic image of the moving signal.

It is another object of this invention to provide an encoder of the type described, which can adaptively encode the moving image by selecting a single parameter which is necessary for the hybrid encoding.

It is a further object of this invention to provide an encoder of the type described, whose operations can effectively be led by such a single parameter without any troublesome control.

It is another object of this invention to provide an encoder of the type described, which minimizes an increase of an amount of information transmitted from the encoder.

An encoder to which this invention is applicable is for use in encoding a moving image into a sequence of encoded image codes in response to a sequence of coefficient blocks. Each coefficient block is composed of a plurality of orthogonal transform coefficients resulting from orthogonal transform of predictive error signals which are produced by predictively coding a plurality of picture elements of the moving image at every picture block. The encoder comprises a quantization unit having a plurality of quantization characteristics, a code conversion unit having a plurality of code conversion characteristics, and a coefficient selection unit having a plurality of coefficient selection characteristics. Each of the coefficient blocks is processed through the quantization unit, the code conversion unit, and the coefficient selection unit into the encoded image codes by selecting the quantization characteristics, the code conversion characteristics, and the coefficient selection characteristics. According to this invention, the encoder comprises classifying means responsive to the coefficient blocks for classifying each of the coefficient blocks into a selected one of statistically determined classes with reference to the orthogonal transform coefficients included in each of the coefficient block, to produce a control signal representative of the selected one of the classes, and delivering means for delivering the control signal to at least two of the quantization unit, the code conversion unit, and the coefficient selection unit to select at least two of the quantization characteristics, the code conversion characteristics, and the coefficient selection characteristics.

BRIEF DESCRIPTION OF THE DRAWING

FIGS. 5(a) and (b) show views for use in describing calculation carried out on classification of each coefficient block;

FIGS. 7(a) through (d) show views for use in describing patterns used in specifying sixteen classes;

FIGS. 15(a) through (c) show tables used in the encoder illustrated in FIG. 14;

FIGS. 16(a) through (d) show digital patterns which can be classified in the encoder illustrated in FIG. 14;

FIG. 17 shows a table used in a part of the classification circuit illustrated in FIG. 14;

FIG. 19 shows a table used in a portion of the classification circuit illustrated in FIG. 18;

Figure 1:
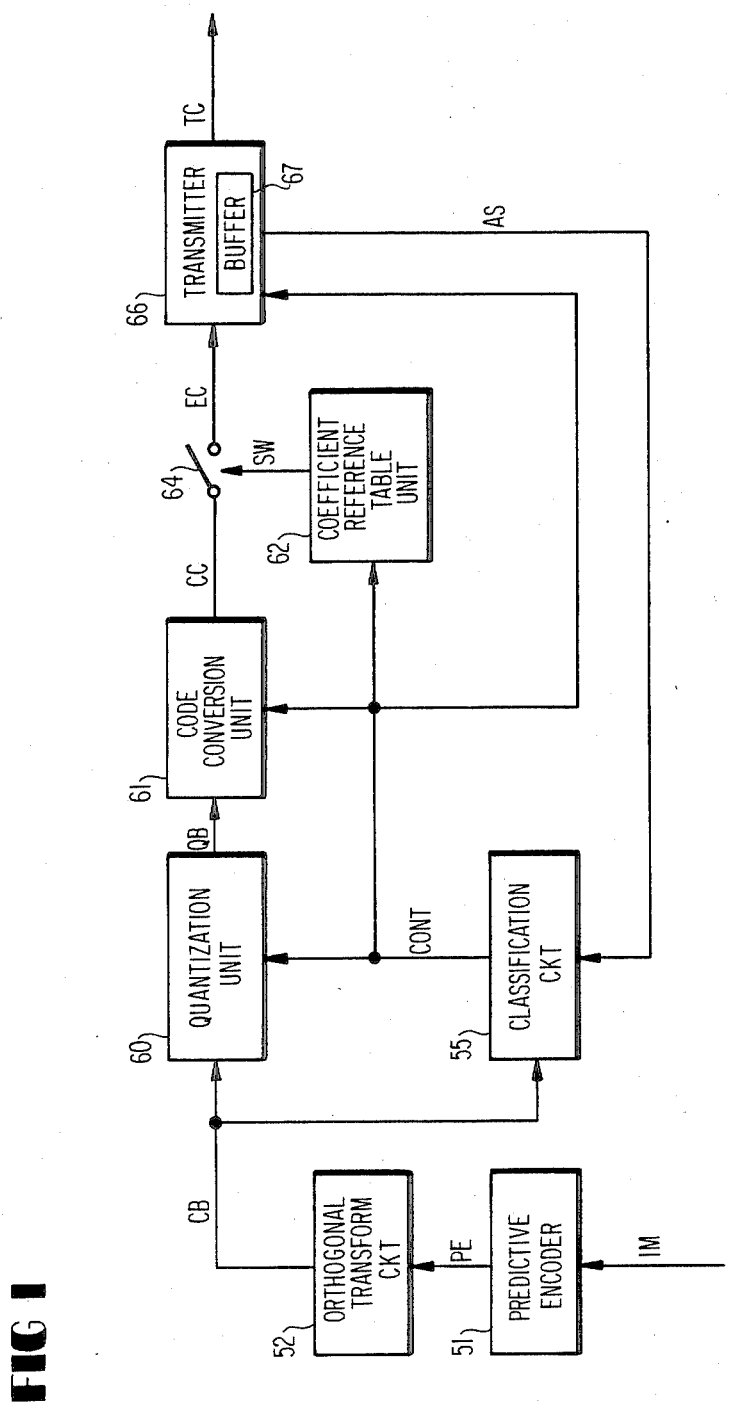
FIG. 1 shows a block diagram of an encoder according to a first embodiment of this invention.

DESCRIPTION OF THE PREFERRED EMBODIMENTS:

Referring to FIG. 1, an encoder according to a first embodiment of this invention is supplied with a sequence of picture element signals IM. The picture element signal sequence IM is derived from picture elements of a moving image and is divisible into a sequence of picture frames. The picture element signal sequence IM is subjected to predictive encoding and orthogonal transform by a predictive encoder 51 and an orthogonal transform circuit 52.

The predictive encoder 51 carries out either intraframe coding or interframe coding in a known manner and produces a sequence of prediction error signals PE as a result of the predictive encoding.

The orthogonal transform circuit 52 transforms the prediction error signal sequence PE into a sequence of orthogonal transform coefficients which specify frequency components of the prediction error signals PE, respectively, and which may often be called coefficients. Such orthogonal transform may be two-dimensional orthogonal transform related to the picture elements arranged in a horizontal and a vertical direction of the moving image and may be, for example, discrete Fourier transform, discrete Cosine transform, Hadamard transform, or the like. Specifically, the orthogonal transform is carried out at every picture block of a predetermined number of the prediction error signals PE related to the same number of the picture elements. The predetermined number may be represented by $n \times n$ or $n \times m$ ($n \neq m$) where n and m are natural numbers. Merely for simplicity of description, the picture block will herein be assumed to be a square and therefore to be represented by $n \times n$.

As is known in the art, the picture block of $n \times n$ is transformed into a coefficient block formed by the same number of the orthogonal transform coefficients. In consequence, the orthogonal transform coefficients are produced as a sequence of the coefficient blocks depicted at CB.

Figure 2:
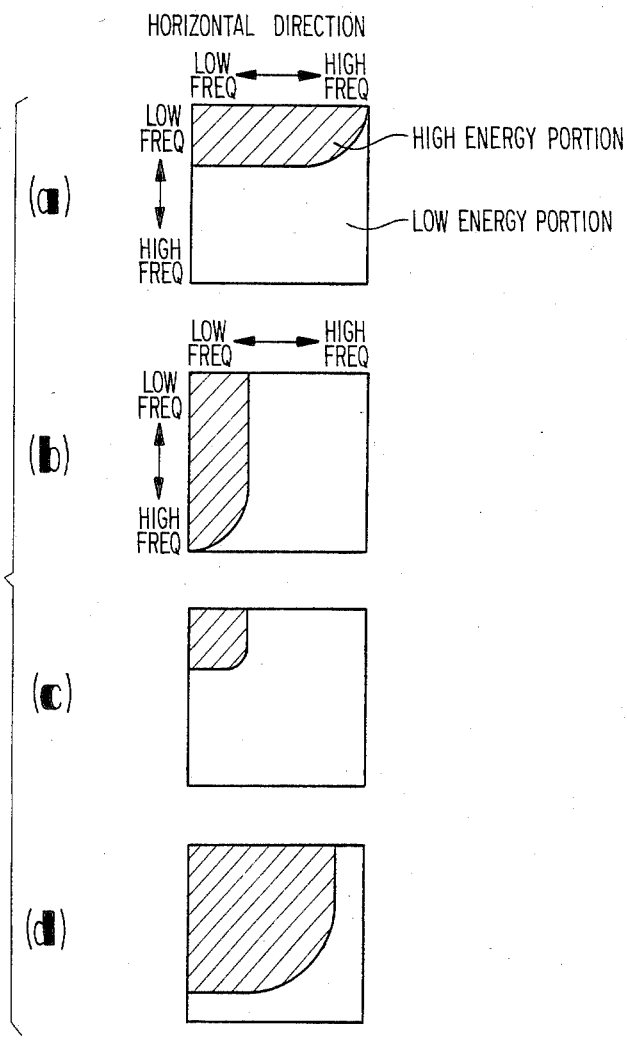
FIGS. 2(a) through 2(d) show energy distributions of orthogonal transform coefficients.
Figure 3:
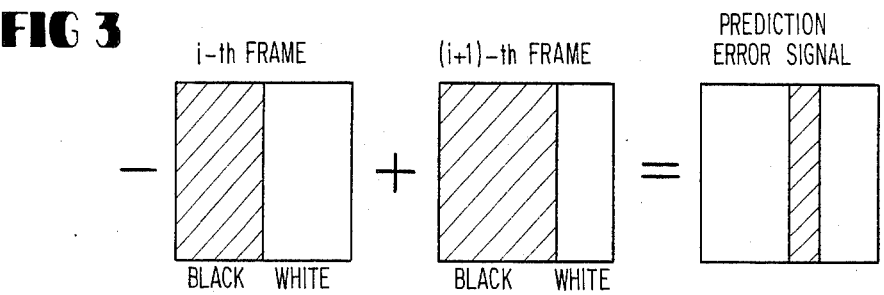
FIG. 3 shows a view for use in describing predictive encoding.

Temporarily referring to FIGS. 2 and 3 together with FIG. 1, it is to be noted that each coefficient block specifies a distribution of the frequency components of the picture block and may be considered to be an energy distribution within a frequency band between a high and a low frequency region (FREQ). Such an energy distribution is present along the horizontal and the vertical directions in the manner generally shown in FIG. 2. Details of FIG. 2 will presently be described.

In FIG. 3, it is surmised that the predictive encoding and the orthogonal transform are carried out in relation to the picture blocks of i-th and (i+1)-th frames each of which has black and white image portions with vertical edges extended within the picture blocks. The black image portions of the picture blocks rapidly expands or broadens between the i-th and the (i+1)-th frames along the horizontal direction. This means that the moving image has a rapid movement only along the horizontal direction and a slow movement along the vertical direction, as depicted at hatched portions. When the interframe coding is carried out between the i-th and (i+1)-th frames by subtracting the (i+1)-th frame from the i-th frame, an interframe prediction error signal is produced between the i-th and the (i+1)-th frames and can be illustrated as shown in FIG. 3.

Let a prediction error signal as shown in FIG. 3 be given as the block and be subjected to the orthogonal transform. In this event, the orthogonal transform coefficients have an energy distribution illustrated in FIG. 2(a). From FIG. 2(a), it is readily understood that the energy distribution is interspersed from the low frequency region towards the high frequency one along the horizontal direction while it is locally dense within the low frequency region along the vertical direction when the rapid movement takes place along the horizontal direction, as illustrated at a hatched portion in FIG. 2(a).

On the other hand, when the predictive encoding is carried out about the moving image which has a slow movement along the horizontal direction and a rapid movement along the vertical direction, the energy distribution of the coefficient block is concentrated within the low frequency region along the horizontal direction, although the energy distribution is dispersed from the low frequency region to the high frequency one along the vertical direction, as illustrated in FIG. 2(b).

When the moving image is stationary in the picture block, the energy distribution of the coefficient block in question is concentrated within the low frequency regions along the horizontal and the vertical directions, as shown in FIG. 2(c).

When the moving image is rapidly changed or varied in the picture block, the energy distribution of the coefficient block under consideration is dispersed from the low frequency region to the high frequency one along both the horizontal and the vertical directions, as illustrated in FIG. 2(d).

As mentioned above, a low energy portion of the energy distribution is variable depending upon a change or movement of the moving image.

It is known in the art that the orthogonal transform provides a low energy distribution of orthogonal transform coefficients within a high frequency region and that a reproduction is not degraded even when such orthogonal transform coefficients within the high frequency region are not encoded and transmitted to a decoder. Accordingly, the orthogonal transform is effective to improve a coding efficiency by not encoding the orthogonal transform coefficients within the high frequency region.

Herein, each coefficient block has a variable low energy portion of the energy distribution and a variable high energy portion thereof. Inasmuch as encoding may be carried out only about a high energy portion of the energy distribution to produce a sequence of encoded codes EC, it is not effective that a whole of each coefficient block is always encoded. In other words, it is preferable that an area to be encoded is selected and varied by monitoring a high energy portion of each coefficient block.

In FIG. 1, the coefficient blocks CB are successively delivered to a classification circuit 55 for classifying each coefficient block into a selected one of statistically determined classes with reference to the orthogonal transform coefficients included therein. Such classification of each coefficient block CB will be detailed later. For the time being, it may be understood that the classification circuit 55 produces a control signal CONT representative of the selected class by monitoring the coefficient blocks CB which vary from a coefficient block to another.

In the illustrated example, the control signal CONT is delivered to all of a quantization unit 60, a code conversion unit 61, and a coefficient reference table unit 62, which will be described later in detail. Thus, the control signal CONT is used as a single parameter for controlling three units of the encoder. Therefore, encoding control is very simplified in the illustrated encoder.

For convenience of description, the coefficient reference table circuit 62 will be described at first. The coefficient reference table circuit 62 acts to select significant ones of the orthogonal transform coefficients from each coefficient block CB in response to the control signal CONT. More specifically, the control signal CONT may be considered as being indicative of the high energy portions of the energy distributions depicted at the hatched portions in FIGS. 2(a) to 2(d). The coefficient reference table circuit 62 stores a plurality of reference tables, each of which indicates significant ones of the orthogonal transform coefficients corresponding to each high energy portion of the energy distribution. Thus, the reference tables serve to distinguish the significant coefficients from insignificant coefficients of each coefficient block. As a result, only the significant coefficients in the coefficient block are encoded with the insignificant coefficients being not encoded and are produced as the encoded codes, which is very effective to reduce an amount of the encoded codes EC to be transmitted to a decoder (not shown).

Description will be directed to the quantization unit 60 and the code conversion unit 61 hereinunder. Let the orthogonal transform coefficients have variable signal levels and be classified into a plurality of the classes at every coefficient block in the above-mentioned manner. In this event, the orthogonal transform coefficients in each class have a signal level distribution different from those in the other classes.

Figure 4:
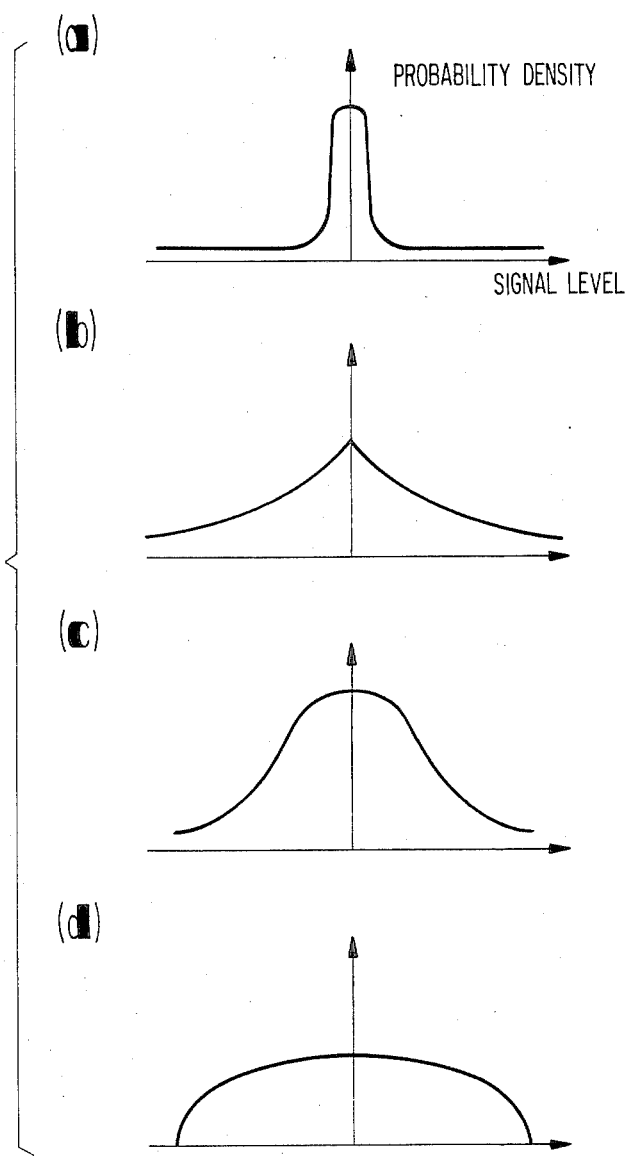
FIGS. 4(a) through (d) show graphical representations for use in describing a relationship between the energy distributions and signal level distributions.

Referring to FIG. 4 in addition to FIG. 2, it is assumed that the coefficient block has the energy distribution as illustrated in FIG. 2(c) because a variation of the moving image is scarce. The resultant energy distribution of the coefficient block in question is concentrated within the low frequency region along both the horizontal and the vertical directions. This shows that the signal levels of the coefficients have a signal level distribution concentrated on a predetermined level of, for example, zero in probability density, as illustrated in FIG. 4(a).

On the other hand, when the energy distribution of the coefficient block is dispersed from the low frequency region to the high frequency region, as shown in FIG. 2(d), the signal levels of the coefficients are irregularly varied in the coefficient block in question and exhibit a signal level distribution which is not concentrated on the predetermined level, as shown in FIGS. 4(b), (c), and (d).

Anyway, the signal level distributions are varied in dependency upon the energy distributions of the coefficient blocks. In this situation, it is not preferable that the quantization unit 60 and the code conversion unit 61 have a fixed or single quantization characteristic and a fixed or single code conversion characteristic, respectively. This is because such fixed quantization and code conversion characteristics can not adaptively respond to variation of the signal level distributions and result in degradation of the encoding efficiency.

Taking the above into consideration, the signal level distributions of the coefficients in the coefficients blocks are statistically determined for the respective classes. Moreover, quantization characteristics and code conversion characteristics are defined for the respective classes. In other words, the illustrated quantization and code conversion units 60 and 61 (FIG. 1) have a plurality of quantization characteristics and a plurality of the code conversion characteristics, respectively.

Herein, the quantization characteristics are specified by quantization steps which are different from one another and which correspond to the classes indicated by the control signal CONT. Responsive to the control signal CONT, the quantization unit 60 selects one of the quantization characteristics to successively quantize the coefficient blocks CB one by one into a sequence of quantized blocks QB in accordance with one of the quantization steps for the selected quantization characteristic. Each quantized block QB is composed of quantized coefficients corresponding to the orthogonal transform coefficients, respectively.

Likewise, the code conversion unit 61 is connected to the quantization unit 60 and selects one of the code conversion characteristics in response to the control signal CONT to carry out code conversion of the quantized block sequence QB and to produce a sequence of code converted blocks CC, each of which is composed of converted coefficients for the quantized coefficients. The code conversion unit 61 may carry out variable-length coding.

The code converted block sequence CC is sent to a switch 64 controlled in response to a switching signal SW produced by the coefficient reference table unit 62. The switching signal SW is produced in accordance with the reference table selected in the coefficient reference table unit 62. Consequently, the switch 64 is closed only on reception of significant ones of the converted coefficients that correspond to the significant coefficients. The significant converted coefficients are sent as the encoded codes, namely, encoded image codes EC to a transmitter 66 together with the control signal CONT. As mentioned above, only the significant converted coefficients are selectively produced as the encoded codes EC. Therefore, the amount of the encoded codes EC is considerably decreased with redundancy removed. The table unit 62 and the switch 64 may be referred to as a coefficient selection unit which has a plurality of coefficient selection characteristics and which selects the coefficients in accordance with a selected one of the coefficient selection characteristics.

A combination of the encoded codes EC and the control signal CONT is transmitted as a sequence of transmission codes TC to the decoder. The decoder can decode the transmission code sequence TC into a reproduction of the encoded codes EC by the use of the control signal CONT which acts as a single parameter. Thus, the encoded codes EC can be reproduced by transmission of only the single parameter. It is therefore possible to minimize an increase of an amount of transmission codes TC.

Further description will be made about the quantization unit 60 and the code conversion unit 61. It is to be understood that the orthogonal transform coefficients in a single one of the coefficient blocks CB are divided into high frequency coefficients and low frequency coefficients in the high and the low frequency regions, respectively. The high frequency coefficients have a signal level distribution different from the low frequency coefficients. This shows that the signal level distributions are also variable within the single coefficient block and that the quantization characteristics and the code conversion characteristics are preferably varied within the single coefficient block in consideration of the signal level distributions to accomplish a high efficiency of the encoder.

Moreover, the amount of the transmission codes TC must often be varied with time in a certain encoder. In such an encoder, the encoded codes EC are stored in a buffer 67 included in the transmitter 66. The amount of the encoded codes EC is monitored in a usual manner to be fed back to the classification circuit 55 as an amount signal AS representative of the amount of the encoded codes EC. The classification circuit 55 modifies a classification operation in response to the amount signal AS. Herein, the quantization characteristics are specified by different quantization steps. As the quantization steps become small, the amount of the encoded codes EC increases. Otherwise, the amount of the encoded codes EC decreases. As a result, the amount of the encoded codes EC can be modified by modifying the quantization steps. Specifically, such modification is carried out so that the quantization steps become coarse when the amount of the encoded codes EC should be restricted. In other words, modification is made so as to select one of the coefficient blocks that includes a smaller number of the coefficients.

Now, consideration will be made about classification of the classification circuit 55. Such classification can be accomplished by the use of a vector quantization method. In the vector quantization method, a plurality of reference block patterns are previously selected to specify features of blocks different from one another and are made to correspond to the respective classes. Under the circumstances, calculation is made about a distance between the respective reference block patterns and each coefficient block so as to determine which one of the block patterns has the closest distance to the coefficient block in question. The distance might be calculated in a manner to be described hereinunder.

Figures 5, 6:
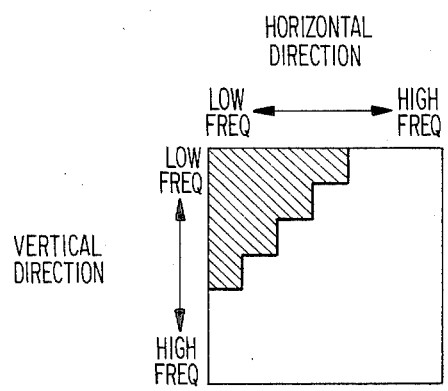
FIG. 6 shows a view for use in describing another method of classifying each coefficient block.

Referring to FIG. 5, let first through fourth patterns of two by two be selected as the reference block patterns, as illustrated in FIG. 5(a), and be numbered from (i) to (iv), respectively. Each pattern has four coefficients arranged in square and numbered from an upper row to a lower one. The first through the fourth patterns (i) to (iv) may be made to correspond to first through fourth ones of the classes, respectively. It is assumed that an input pattern illustrated in FIG. 5(b) is given as the coefficient block and that each distance between the input pattern and the first through the fourth patterns (i) to (iv) is calculated in the form of a square sum of differences of the respective coefficients between the input pattern and each of the first through the fourth patterns. In this case, the distance between the first pattern (i) and the input pattern is defined by the square sum given by:

$$(3-2)^2+(0-1)^2+(0-1)^2+(0-0)^2$$

and is equal to 3. Likewise, the distances between the second and the input patterns, between the third and the input patterns, and between the fourth and the input patterns are equal to 9, 15, and 9, respectively.

From this fact, it is possible for the classification circuit 55 to judge that the first pattern (i) is the closest one in the first through fourth patterns to the input pattern. As a result, the input pattern illustrated in FIG. 5(b) is classified into the first class corresponding to the first pattern (i).

Calculation may be made about a sum of absolute values of the differences between the input pattern and each of the first through the fourth patterns to detect the closest distance.

Instead of the vector quantization, a simple method may be used to classify the coefficient blocks CB because the vector quantization requires a complexed operation.

Referring to FIG. 6, classification is made only by selecting a specific part from each coefficient block, as shown at a cross-hatched portion in FIG. 6. As readily understood from FIG. 6, the specific part is laid in the low frequency regions along the horizontal and the vertical directions. This is because features of the coefficient blocks are dependent on the coefficients in the low frequency regions. In this method, calculation is made only about the coefficients derived from the specific part so as to determine a distance between the input pattern and reference patterns.

Referring to FIGS. 7(a) through 7(d), first through sixteenth typical patterns No. 1 to No. 16 are exemplified for first through sixteenth ones of the classes, respectively. The first through the sixteenth typical patterns form digital blocks. Each of the patterns consists of sixty-four digital orthogonal transform coefficients which are arranged in square of eight by eight and which may be simply called digital coefficients. Each digital coefficient is derived by comparing the orthogonal transform coefficients with a threshold level. In the example being illustrated, the digital coefficients take logic "1" and "0" levels when each absolute value of the orthogonal transform coefficients is greater than and is not greater than the threshold level, respectively. In any event, the first through sixteenth classes are statistically determined in relation to a distribution of the digital coefficients. Thus, the logic "1" and "0" levels are representative of high and low energy coefficients, respectively.

The coefficients of each input coefficient block are digitized into input digital coefficients in a manner similar to that illustrated in FIGS. 7(a) through 7(d) and are compared with reference patterns determined for the first through sixteenth classes to calculate distances between the input digital coefficients and the digital coefficients of the reference patterns.

As shown in FIGS. 7(a) through 7(d), the digital coefficients of the logic "1" level are distributed from the low frequency regions towards the high frequency regions along the horizontal and the vertical directions. In addition, each digital coefficient of the logic "1" level is associated with the other digital coefficients of the logic "1" level with a high probability. The resultant digital coefficients of the logic "1" level are locally gathered or collected in the low frequency regions and has a domain defined by a boundary line of the logic "1" levels which are arranged on the side of the high frequency region. In other words, each coefficient block can be defined by the boundary line of the logic "1" levels. In order to specify the boundary line, position information or a boundary position signal may be given which is derived from the digital coefficients arranged along the boundary line. From this fact, it is seen that classification of the coefficient blocks is possible by the use of position information alone.

Referring to FIGS. 8(a), (b), and (c), the domains defined by the boundary lines in FIGS. 7(a) through 7(d) are approximately outlined by a rectangular shape, a triangular shape, and a rectangular shape with a part cut away, respectively. In FIG. 8(a), the domain of the rectangular shape is determined by two factors L1 and L2 which are representative of a width and a length, respectively. Therefore, the width and the length L1 and L2 may be given as the position information so as to specify the rectangular shape domain. In FIG. 8(b), the triangular domain is specified by three parameters which are representative of two sides L1, L2 of the triangle, and a length L3 of a line perpendicular to a hypotenuse of the triangle. In FIG. 8(c), the domain of the rectangular shape partially cut away is determined by the position information of three parameters L1, L2, and L3 like in FIG. 8(c). The domain of FIG. 8(c) may be specified by the parameter L3 alone. Thus, the first through sixteenth typical patterns No. 1 to No. 16 illustrated in FIGS. 7(a) through 7(d) can be specified by the above-mentioned parameters. Stated otherwise, the first through sixteenth classes are defined by the use of the parameters.

Figure 9:
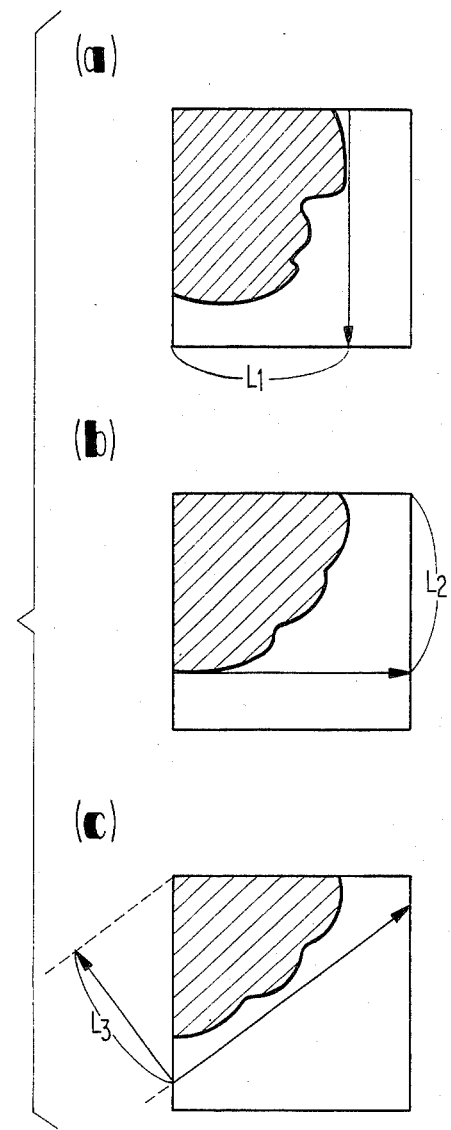
FIGS. 9(a) through (c) show views for use in describing a method of deriving parameters from an actual pattern.

Referring to FIGS. 9(a), (b), and (c), domains of the logic "1" levels are illustrated by hatched portions. It is possible to derive the three parameters L1, L2, and L3 from each input coefficient block by scanning the input coefficient block in a horizontal direction, a vertical direction, and an oblique direction, as shown in FIGS. 9(a), 9(b), and 9(c), respectively. The three parameters L1, L2, and L3 of the input coefficient block are compared with those of the reference coefficient blocks to calculate distances between the input and the reference coefficient blocks. With this method, the input coefficient block is comparatively readily classified into a selected one of the classes in the classification circuit 55 (FIG. 1).

Figure 10:
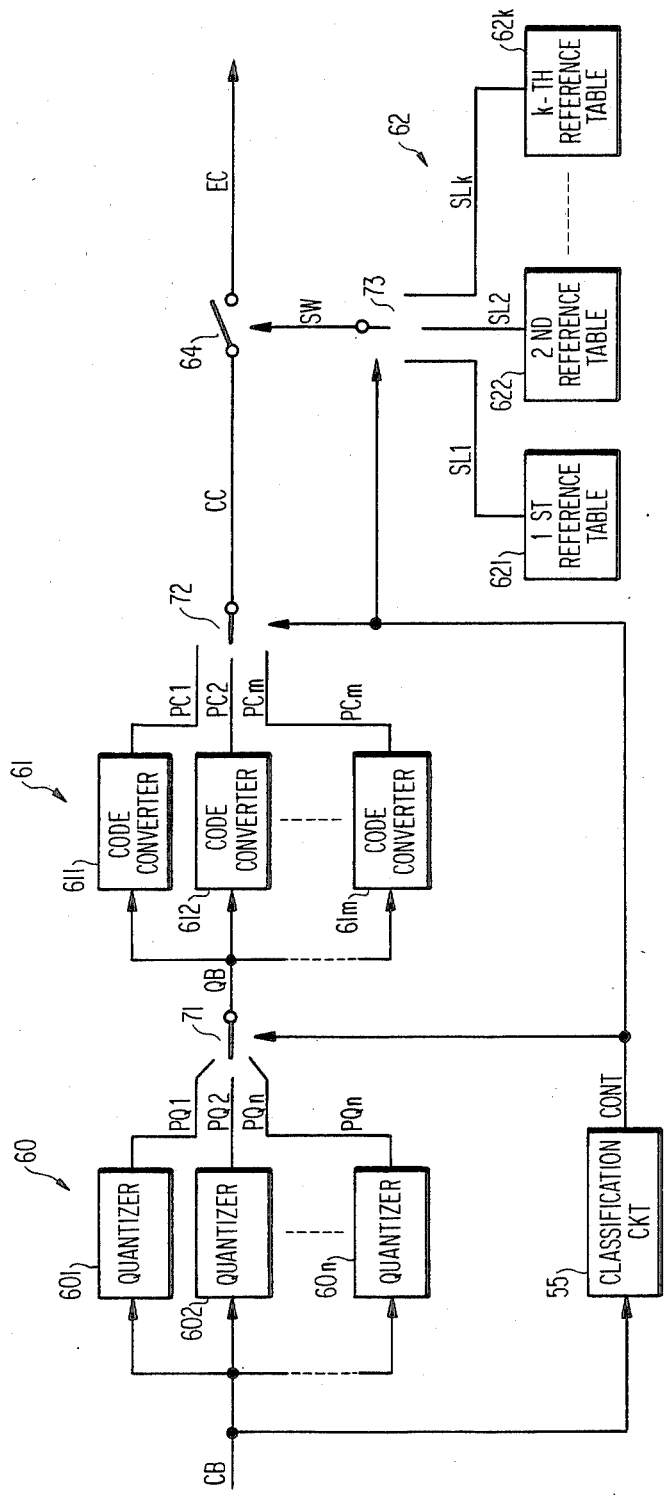
FIG. 10 shows a block diagram of an encoder according to a second embodiment of this invention.

Referring to FIG. 10, an encoder according to a second embodiment of this invention comprises similar parts and signals designated by like reference numerals and symbols. In the example being illustrated, the quantization unit 60 comprises first through n-th quantizers which are depicted at 601, 602, . . . , 60n. The first through n-th quantizers 601 to 60n are connected in parallel to one another and are supplied with the coefficient blocks CB in common. The number n may be, for example, eight or sixteen and may be made to correspond to the number of the classes. The number n of the quantizers 601 to 60n may not always be equal to the number of the classes but may be smaller than the number of the classes because the classes can be also specified by a combination of the quantizers 601 through 60n in addition to each of the quantizers 601 through 60n, although description will be made on the assumption that the quantizers 601 to 60n are equal in number to the classes for brevity of description.

In this connection, the first through n-th quantizers 601 to 60n have first through n-th quantization characteristics defined by different quantization steps, respectively. As a result, each of the coefficient blocks CB is individually quantized into first through n-th preliminary quantized block signals PQ1 to PQn, respectively.

In the illustrated quantization unit 60, the first through n-th preliminary quantized block signals PQ1 through PQn are sent to a first local switch 71 controlled by the control signal CONT which is indicative of the selected one of the classes and which is delivered from the classification circuit 55. The first local switch 71 selects one of the preliminary quantized block signals PQ1 to PQn in response to the control signal CONT to produce the selected preliminary quantized block signal as the quantized block QB.

The quantized block QB is supplied from the quantization unit 60 to the code conversion unit 61 in a manner similar to that illustrated in FIG. 1. In the example being illustrated, the code conversion unit 61 comprises first through m-th code converters 611 to 61m. The number m may not be equal to the number n of the quantizers 601 to 60n. The first through m-th code converters 611 to 61m are connected in parallel to one another and are given the quantized block QB in common. The first through m-th code converters 611 to 61m have different code conversion characteristics determined for the classes, respectively. In this event, a single one of the code conversion characteristics may be used in common to a plurality of the classes. Each code converter may be, for example, a variable-length encoder, as known in the art.

The first through m-th code converters 611 to 61m to carry out code conversion of the quantized block QB in accordance with the code conversion characteristics to individually produce first through m-th preliminary code converted block signals PC1 to PCm. A second local switch 72 selects one of the preliminary code converted block signals PC1 to PCm in response to the control signal CONT and sends the selected preliminary code converted block signal as the code converted block CC to the switch 64. As mentioned in conjunction with FIG. 1, the switch 64 is turned on or off in response to the switching signal SW given from the coefficient reference table unit 62.

The illustrated coefficient reference table unit 62 stores first through k-th reference tables 621 to 62k which may be in one-to-one correspondence to the classes. Each of the reference tables 621 to 62k has a plurality of addresses which may be made to correspond to positions of the digital coefficients arranged in the manner illustrated in FIGS. 7(a) through 7(d) and stores the logic "1" or "0" level in each address. In FIGS. 7(a) through 7(d), the number k is equal to sixteen. The reference tables 621 to 62k are successively accessed or scanned by a clock circuit (not shown) to produce sequences of the digital coefficients in the form of local switching signal sequences SL1 to SLk. A third local switch 73 selects one of the local switching signal sequences SL1 to SLk in response to the control signal CONT to supply the selected local signal sequence to the switch 64 as the switching signal SW.

When the switching signal SW takes the logic "1" and "0" levels, the switch 64 is closed and opened, respectively, as described before. As a result, code converted coefficients of the code converted block CC are allowed to pass through the switch 64 as the encoded codes EC only when the switching signal SW takes the logic "1" level. Otherwise, the code converted coefficients are intercepted by the switch 64. Thus, significant ones of the code converted coefficients are distinguished from nonsignificant ones thereof and are produced as the encoded codes. Therefore, it is readily understood that an amount of the encoded codes is remarkably reduced by selecting the significant code converted coefficients in accordance with the selected reference table.

Figure 11:
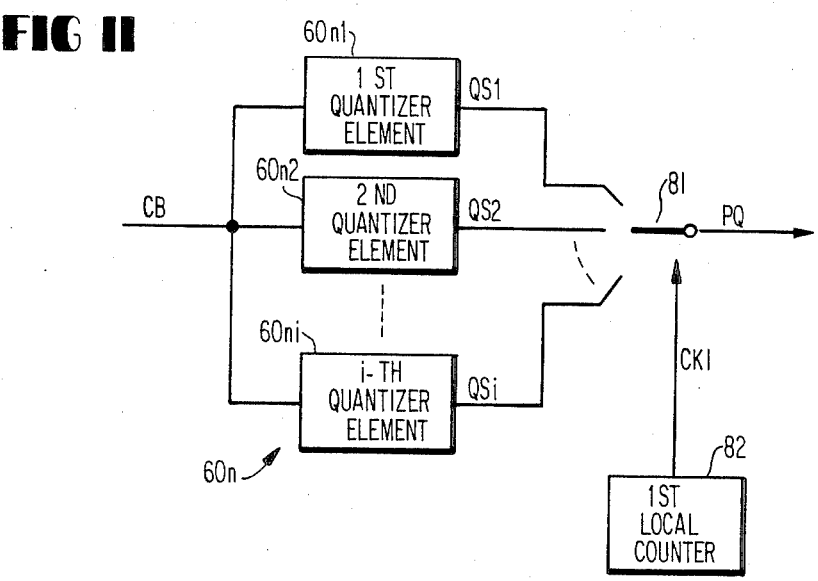
FIG. 11 shows a block diagram of a part of an encoder according to a third embodiment of this invention.
Figure 12:
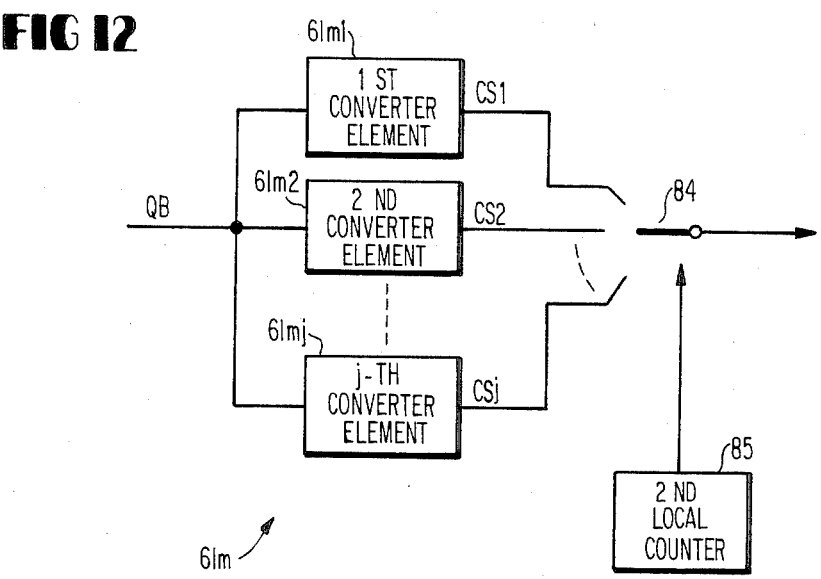
FIG. 12 shows a block diagram of anoher part of the encoder according to the third embodiment of this invention.

Referring to FIGS. 11 and 12 together with FIG. 10, an encoder according to a third embodiment of this invention is for use in varying the quantization characteristics and the code conversion characteristics within each of the coefficient blocks. As mentioned before, the coefficients of each coefficient block are divisible into the high frequency coefficients and the low frequency ones, both of which have signal level distributions different from each other. Therefore, it is preferable that the high and the low frequency coefficients in each coefficient block are quantized by different quantization characteristics and are converted by different code conversion characteristics. For this purpose, each quantizer and each code converter illustrated in FIG. 10 have structures illustrated in FIGS. 11 and 12, respectively. The quantizer and the code converter are represented by 60n and 61m in FIGS. 11 and 12, respectively.

In FIG. 11, the illustrated quantizer 60n comprises first through i-th quantizer elements $60n_1$, $60n_2$, ..., $60n_i$, which are connected in parallel to one another and which are supplied with the coefficient blocks CB in common. The quantizer elements $60n_1$ to $60n_i$ are made to correspond to the coefficients arranged along the horizontal and the vertical direction, as shown in FIGS. 7(a) to (d) and may therefore be equal in number, for example, to sixty-four. Each quantizer element $60n_1$ to $60n_i$ can be readily formed by a read-only memory for conversion of, for example, eight bits into four bits. The respective quantizer elements $60n_1$ to $60n_i$ have partial quantization characteristics determined for the above-mentioned coefficients, respectively, and carry out quantization of the coefficient blocks in accordance with the partial quantization characteristics to successively produce quantized coefficient signals QS1 to QSi in parallel.

The quantized coefficient signals QS1 to QSi are sent to a first additional switch 81 controlled by a first local counter 82. The first local counter 82 supplies the first additional switch 81 with a sequence of first clock pulses CK1. Responsive to the first clock pulse sequence CK1, the first additional switch 81 successively selects the first through i-th quantizer elements $60n_1$ to $60n_i$ one by one to produce the quantized coefficient signals QS1 to QSi as the preliminary quantized block PQ (suffix omitted). Such selection is repeated at every coefficient block CB.

In FIG. 12, the illustrated code conversion unit 61m comprises first through j-th converter elements $61m_1$, $61m_2$, ... $61m_j$ which are connected in parallel to one another and which are supplied with each of the quantized blocks QB in common. The converter elements $61m_1$ to $61m_j$ have partial code conversion characteristics which are made to correspond to the coefficients arranged in each coefficient block. In this event, each of the converter elements may correspond to a plurality of the coefficients and produces local code converted blocks CS1, CS2, ..., CSj.

The local code converted blocks CS1 to CSj are successively switched by a second additional switch 84 one by one in response to a sequence of second clock pulses CK2 supplied from a second counter 85. Such switching operation is repeated at every coefficient block to produce the code converted blocks CC.

The first and the second local counters 82 and 85 may have count periods determined by the numbers of the quantizer elements $60n_1$ to $60n_i$ and the converter elements $61m_1$ to $61m_j$, respectively. Thus, each of the coefficients can be quantized and converted at every coefficient by the use of an optimum quantization characteristic and an optimum code conversion characteristic in the encoder according to the third embodiment of the invention.

Figure 13:
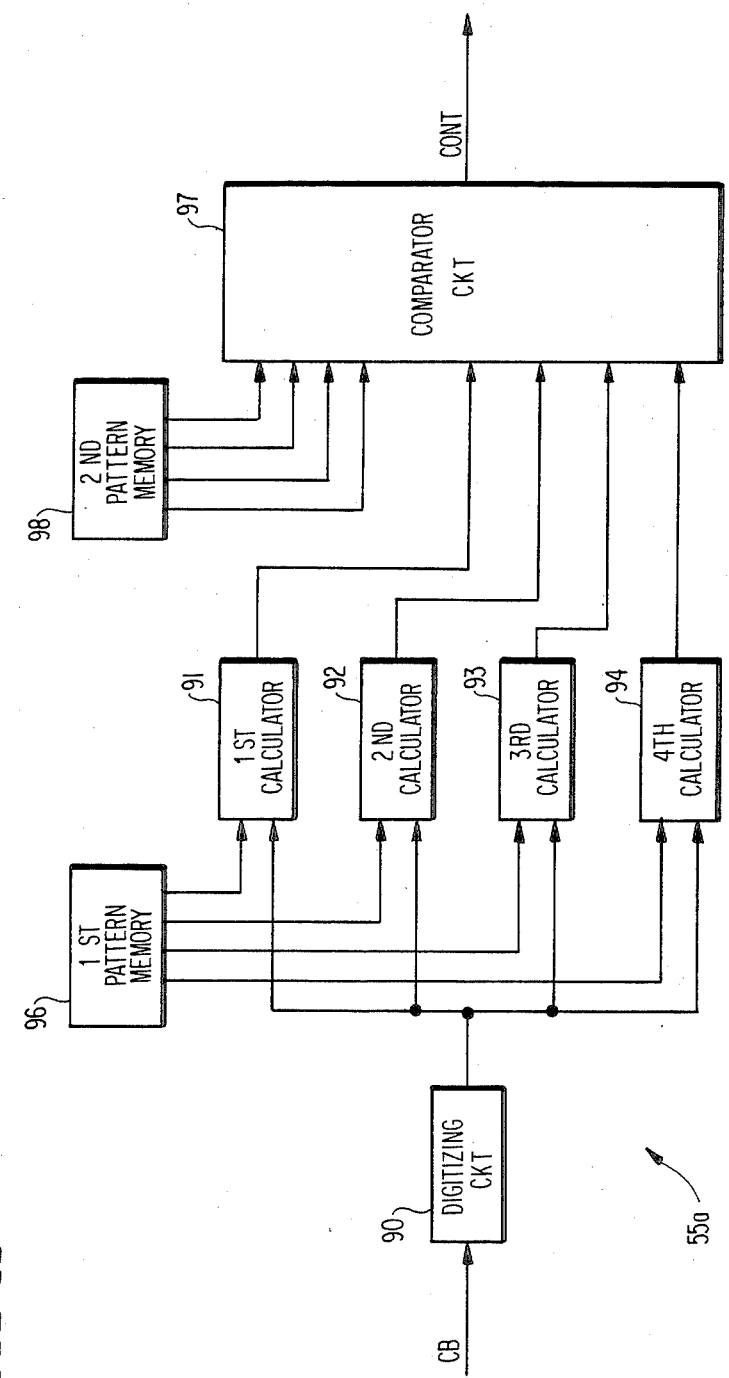
FIG. 13 shows a block diagram of a classification circuit for use in an encoder according to a fourth embodiment of this invention.

Referring to FIG. 13, an encoder according to a fourth embodiment of the invention is specified by a classification circuit 55a as shown in FIG. 13. It is assumed that the illustrated classification circuit 55 is operable to classify each of the coefficient blocks CB into four of the classes. Each coefficient block CB may be formed by the coefficients of $A \times B$ where A and B are natural numbers and equal to one another.

A digitizing circuit 90 digitizes each coefficient block into a digital block by comparing the respective coefficients with a predetermined threshold level. As a result, the digitizing circuit 90 produces digital coefficients which take the logic "1" and the logic "0" levels when the coefficients are greater and not greater than the threshold level, as illustrated in FIGS. 7(a) to 7(d). The digital coefficients in each digital block are delivered to first through fourth calculators 91 to 94 which are supplied with first through fourth reference patterns from a first pattern memory 96 and which carry out calculations of a predetermined evaluation function in a manner exemplified in conjunction with FIG. 5.

Each of the first through fourth calculators 91 to 94 may comprise a plurality of Exclusive OR gates which correspond to the coefficients in each coefficient block and which produce the logic "1" and the logic "0" levels on occurrence of incoincidence and coincidence between the digital coefficients and reference coefficients of the reference patterns, respectively. In each calculator 91 to 94, a degree of coincidence can be evaluated by the number of the logic "1" or the logic "0" level, as readily understood from the above. The degree of coincidence is representative of a correlation between the digital block and each reference pattern. Anyway, results of evaluation are supplied from the respective calculators 91 to 94 to a comparator circuit 97 in the form of the number of the logic "1" levels. The degree of the coincidence is high as the number of the logic "1" levels is small, as readily seen from the above.

The comparator circuit 97 compares the results of evaluation with one another to select a minimum one of the results of evaluation. In addition, the comparator circuit 97 is supplied from a second pattern memory 98 with first through fourth index patterns specifying the respective classes. The comparator circuit 97 selects one of the first through fourth index patterns that corresponds to the minimum result of evaluation and that is produced as the control signal CONT. The index patterns may be representative of the numbers of the classes, respectively. Anyway, the comparator circuit 97 and the second pattern memory 98 serve to detect the highest one of the correlations between the digital block and the reference patterns.

The first pattern memory 96 may store sixteen reference patterns which are shown in FIGS. 7(a) to 7(d) and which have regions of the logic "1" levels concentrated on the side of a left upper corner of the coefficient blocks.

Figure 14:
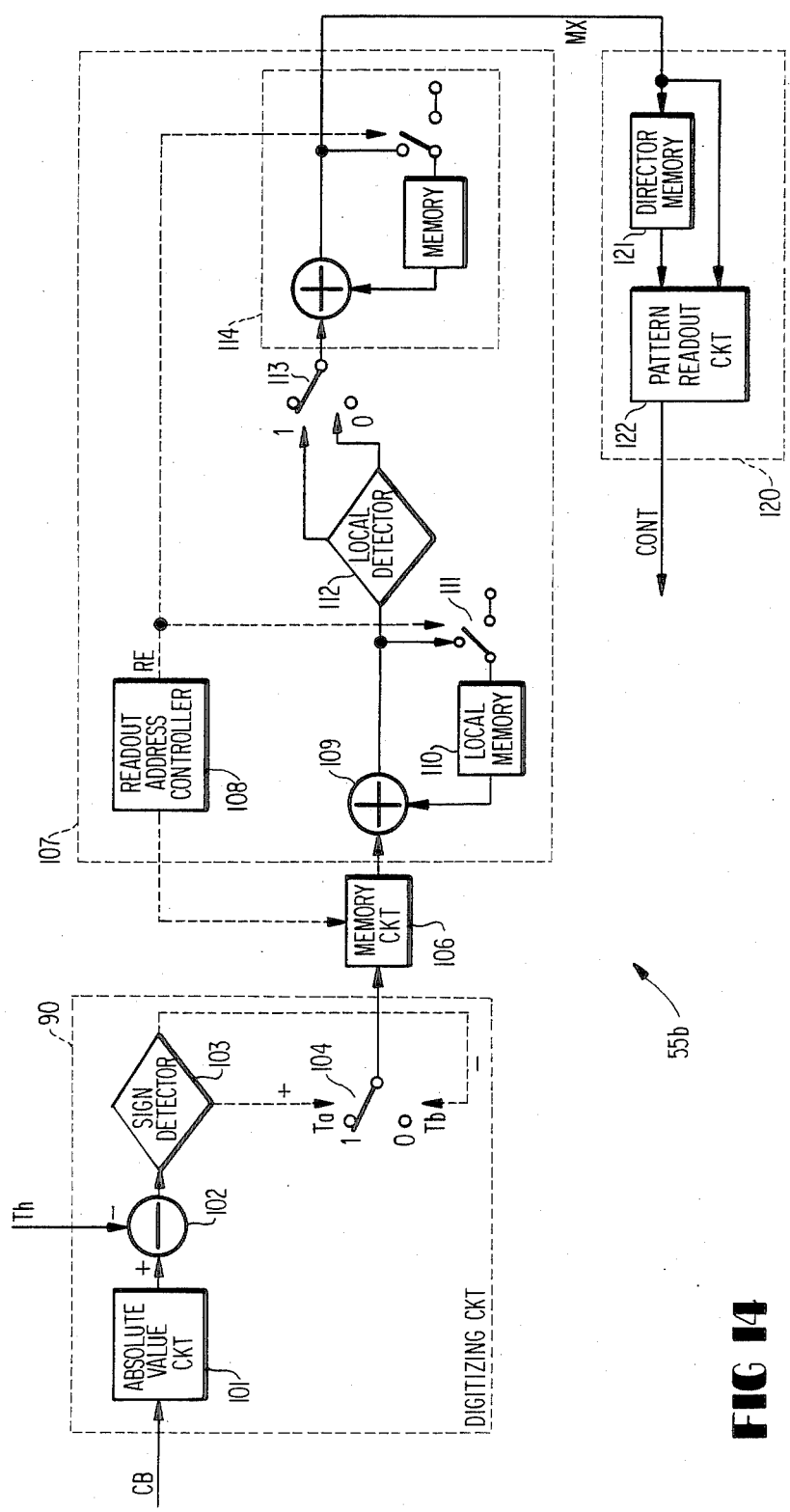
FIG. 14 shows a block diagram of a classification circuit of an encoder according to a fifth embodiment of this invention.

Referring to FIG. 14, an encoder according to a fifth embodiment of this invention comprises a classification circuit 55b illustrated in FIG. 14. The illustrated classification circuit 55b comprises similar parts and signals depicted at the same reference numerals and symbols. More particularly, the classification circuit 55b comprises a digitizing circuit 90 which may be similar to that shown in FIG. 14 and which is supplied with the coefficient blocks CB of the coefficients. Each coefficient takes either a positive value or a negative one and is supplied to the digitizing circuit 90 in the form of a digital signal composed of a predetermined number of bits. The digital signal includes a sign bit representative of either the positive value or the negative value.

The illustrated digitizing circuit 90 comprises an absolute value circuit 101 for removing the sign bit from each digital signal to produce an absolute value signal representative of an absolute value of each coefficient. The absolute value signal is sent to a subtractor 102 which is given a threshold value signal Th representative of a threshold value. The subtractor 102 subtracts the threshold value from the absolute value to produce a difference between the threshold and the absolute values. The difference is fed to a sign detector 103 for detecting whether the difference is positive or negative. When the difference is positive, a switching element 104 selects a terminal Ta to produce a logic "1" level signal. Otherwise, the switching element 104 selects another terminal Tb to produce a logic "0" level signal. At any rate, the logic "1" and the logic "0" level signals are successively sent as digital coefficients to a memory circuit 106 when the absolute value of each coefficient is not smaller than and is smaller than the threshold value, respectively. Thus, the memory circuit 106 has a plurality of addresses which are equal in number to the digital coefficients for each coefficient block and which specify a pair of horizontal and vertical addresses numbered in the horizontal and the vertical directions of FIG. 7. The horizontal address is successively counted from the lefthand column of FIG. 7 to the righthand column thereof while the vertical address is successively counted from the uppermost row of FIG. 7 downwards.

The digital coefficients are stored in the respective addresses of the memory circuit 106 in a manner as illustrated in FIG. 7.

Figure 8:
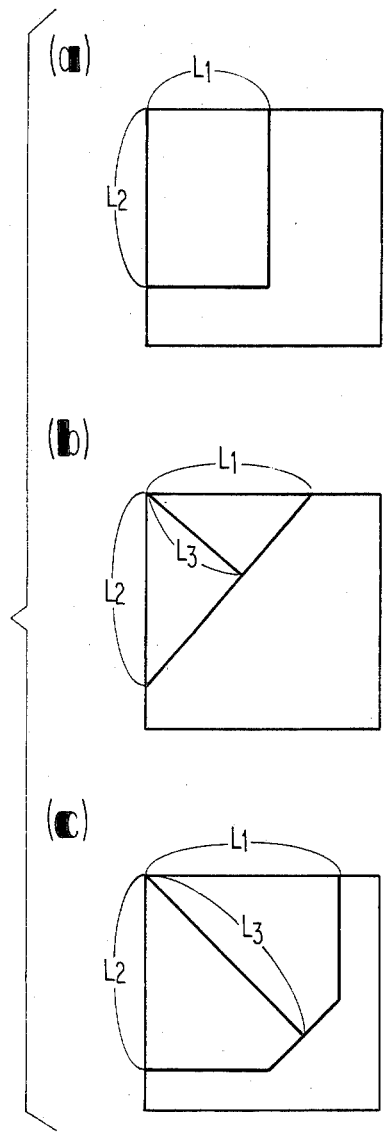
FIGS. 8(a) through (c) show views for use in describing parameters for classifying each coefficient block.

In FIG. 14, a boundary detector 107 is coupled to the memory circuit 106 to detect an outer edge or a boundary line of the logic "1" level signals, namely, significant bits, as described in conjunction with FIGS. 7 and 8. Such detection of the boundary line serves to determine the domain of the logic "1" level signals stored in the memory circuit 106. For this purpose, position information of the boundary line is detected by the use of the boundary detector 107.

The illustrated boundary detector 107 comprises a readout address controller 108 for controlling a readout operation of the memory circuit 106 by scanning each address thereof along a scanning line. Such scanning of the memory circuit 106 may be carried out in the horizontal direction, the vertical direction, and/or the oblique direction of FIG. 7. The scanning line may therefore be a horizontal line, a vertical line, or an oblique line. Let each coefficient block be composed of sixty-four digital coefficients. In this event, sixty-four digital coefficients are successively scanned in a scanning order.

Referring to FIG. 15 together with FIG. 14, the readout address controller 108 may be implemented by a read-only memory and stores a selected one of tables which are determined in relation to the scanning line. When the memory circuit 106 is scanned in the horizontal direction, the readout address controller 108 accesses the table illustrated in FIG. 15(a). On the other hand, the tables of FIGS. 15(b) and (c) are used in the readout address controller 108 to scan the memory circuit 106 in the vertical direction and the direction oblique to the horizontal direction at an angle of 45°, respectively.

As shown in FIGS. 15(a) to 15(c), the scanning order is determined by readout data signals stored in the tables. Each readout data signal is composed of first through third digits which are arranged from the left to the right of the respective tables and which are column or vertical addresses, row or horizontal addresses, and end signals, respectively. The end signal of unity is indicative of completion of scanning along a single scanning line while the end signal of two is representative of completion of scanning of each coefficient block.

The digital coefficients are successively read out of the memory circuit 106 under control of the readout address controller 108 to be sent to an adder 109 and a local memory 110 which is coupled to the adder 109 and a switch unit 111 controlled by the readout address controller 108. The local memory 110 is reset at every scanning line through the switch unit 111 in response to the end signals supplied from the readout address controller 108 to the switch unit 111. Thus, the end signals may be referred to as reset signals RE.

With this structure, the adder 109 adds each digital coefficient to a content of the local memory 110 for each scanning line to supply a sum of each digital coefficient and the content of the local memory 110 to a local detector 112. The local detector 112 detects whether or not the above-mentioned sum is equal to zero. If the sum is equal to zero, no significant coefficient is present for the scanning line in question. On the other hand, when the sum is not equal to zero, the local detector 112 controls a subsidiary switch 113 to supply the logic "1" level signal to a line counter 114. The line counter 114 comprises an adder circuit, a memory, and a switch which are similar to a combination of the adder 109, the local memory 110, and the switch unit 111, respectively, and produces a result of addition which specifies a maximum or outermost address MX for the significant coefficient in each scanning line.

Therefore, the boundary line of the significant coefficients are given in the form of the outermost addresses MX at every scanning line.

The maximum address MX is successively sent to a pattern detector 120 comprising a detector memory 121 and a pattern readout circuit 122.

Referring to FIGS. 16(a) through 16(d) together with FIG. 14, it is assumed that first through sixteenth patterns are scanned by the readout address controller 108 in the horizontal and the vertical directions with reference to the tables illustrated in FIGS. 15(a) and (b). Each pattern has a horizontal and a vertical maximum address which are determined by the upper most row and the leftmost column, respectively, as illustrated in FIGS. 16(a) through 16(d). The horizontal and the vertical maximum addresses specify the boundary line and may be called horizontal and vertical boundary information, respectively. Therefore, the uppermost row of the digital coefficients is scanned along the horizontal direction under control of the readout address controller 108. Consequently, the horizontal maximum address is produced as the maximum address MX and is stored in the detector memory 121.

Subsequently, the leftmost column of the digital coefficients is scanned along the vertical direction to detect the vertical maximum address as the maximum address MX. The vertical maximum address is sent to the pattern readout circuit 122 in synchronism with the horizontal maximum address.

Referring to FIG. 17 together with FIG. 14, the pattern readout circuit 122 may be a read-only memory and is accessed by the horizontal and the vertical maximum addresses to produce a class number or pattern number in accordance with a table illustrated in FIG. 17. The class number is delivered as the control signal CONT to the quantization unit 60, the code conversion unit 61, and the coefficient reference table unit 62 (FIG. 1).

When the table illustrated in FIG. 15(c) is used to scan the memory circuit 106 in the oblique direction and to detect an oblique maximum address therealong, the pattern readout circuit 122 may store a plurality of class numbers arranged in a one-dimension. The detector memory 121 can be accessed only by the oblique maximum address. In this event, the detector memory 121 may be removed from the pattern detector 120.

Alternatively, the horizontal, the vertical, and the oblique maximum addresses are used to access the pattern readout circuit 122 and to produce the control signal CONT. In this case, the pattern readout circuit 122 may store a plurality of class numbers determined by three-dimensional addresses, namely, the horizontal, the vertical, and the oblique maximum addresses. In addition, an additional detector memory may be included in the pattern detector 120 in addition to the detector memory 121 for storing the vertical or the oblique maximum address. With this structure, the classification can be carried out by three parameters in the manner described in conjunction with FIG. 8(c).

Figure 18:
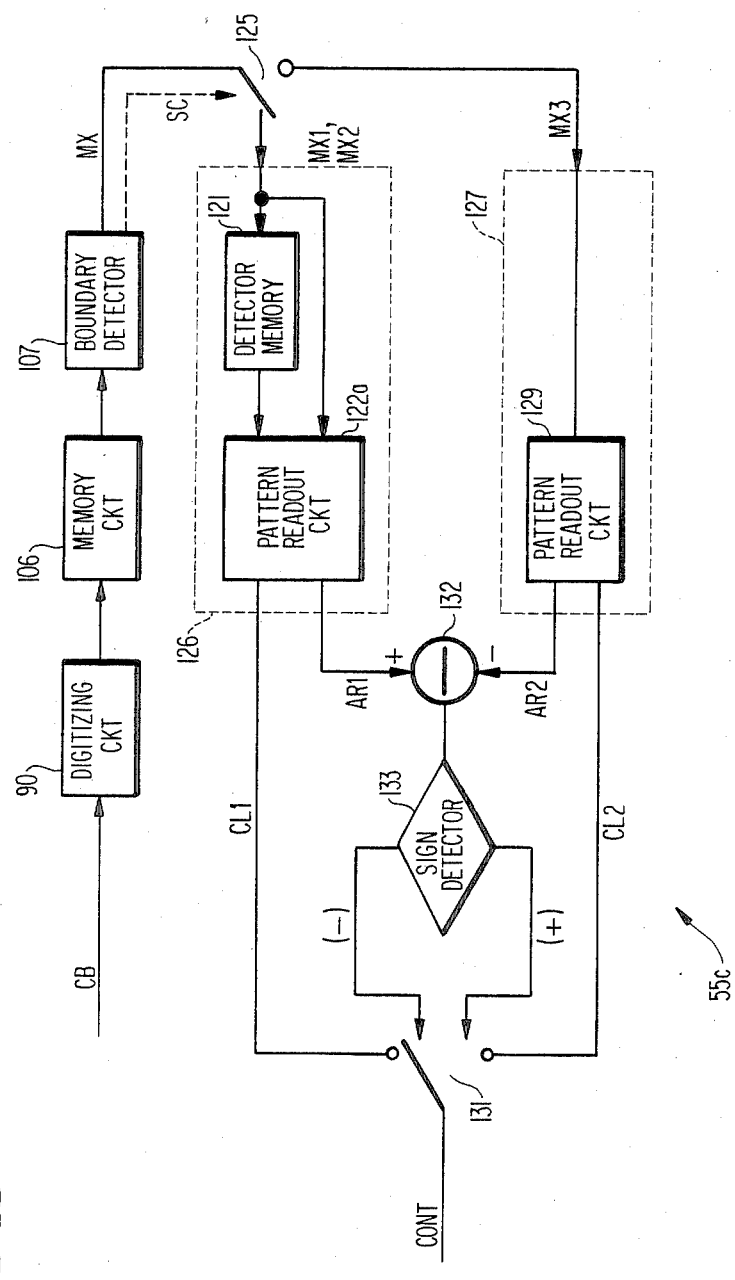
FIG. 18 shows a block diagram of a classification circuit of an encoder according to a sixth embodiment of this invention.

Referring to FIG. 18, an encoder according to a sixth embodiment of this invention is specified by a classification circuit 55c which comprises similar parts and signals designated by like reference numerals in FIG. 14. The maximum address MX is produced from the coefficient blocks CB through the digitizing circuit 90, the memory circuit 106, and the boundary detector 107 in the manner mentioned with reference to FIG. 14.

It is assumed that the illustrated boundary detector 107 successively produces the horizontal, the vertical, and the oblique maximum addresses as the maximum addresses MX. The horizontal and the vertical maximum addresses are depicted at MX1 and MX2, respectively, and sent through a switch 125 to a first pattern detector 126 while the oblique maximum address is depicted at MX3 and sent through the switch 125 to a second pattern detector 127. In this connection, a switch control signal SC is delivered from the boundary detector 107 to the switch 125 in a known manner and may be produced in synchronism with the reset signal RE.

The first pattern detector 126 comprises a detector memory 121 and a pattern readout circuit 122a like in FIG. 14. The pattern readout circuit 122a is supplied with the horizontal and the vertical maximum addresses MX1 and MX2 in a manner similar to that illustrated in FIG. 14.

Referring to FIG. 19 together with FIG. 18, the illustrated pattern readout circuit 122a has a plurality of addresses each of which stores an area of each domain defined by the logic "1" levels in addition to each class number. Each area is representative of the number of the significant coefficients. As shown in FIG. 19, the class numbers are stored as first terms in the respective addresses of the pattern readout circuit 122a while the areas are stored as second terms in the respective addresses.

Likewise, the second pattern detector 127 comprises an additional pattern readout circuit 129 which has a plurality of addresses storing class numbers and areas of the domains. Each address can be specified only by the oblique maximum address.

Responsive to the horizontal and the vertical maximum addresses MX1 and MX2, the first pattern detector 126 reads a first one of the class numbers and a first one of the areas out of the address specified by the horizontal and the vertical maximum addresses MX1 and MX2. The class number and the area are produced as a first class number signal CL1 and a first area signal AR1 and delivered to a switching circuit 131 and a subtractor 132, respectively.

Supplied with the oblique maximum address MX3, the additional pattern readout circuit 129 reads a second one of the class numbers and a second one of the areas out of the address specified by the oblique maximum address MX3. The second class number and the second area are delivered as a second class number signal CL2 and a second area signal AL2 to the switching circuit 131 and the subtractor 132, respectively.

Responsive to the first and the second area signals AR1 and AR2, the subtractor 132 subtracts the second area from the first area to calculate a difference between the first and the second areas. If the first area is wider than the second area, the difference has a positive sign (+). In this event, a sign detector 133 makes the switching circuit 131 select the second class number signal CL2. The second class number signal CL2 is produced as the control signal CONT.

If the first area is not wider than the second area, the subtractor 132 produces the difference having a negative sign (−). In this case, the first class number signal CL1 is selected by the switching circuit 131 and produced as the control signal CONT. Thus, the switching circuit 131 selects the class number indicated by a smaller one of the first and the second areas. This serves to reduce an amount of the encoded codes, as readily understood from the above.

Figure 20:
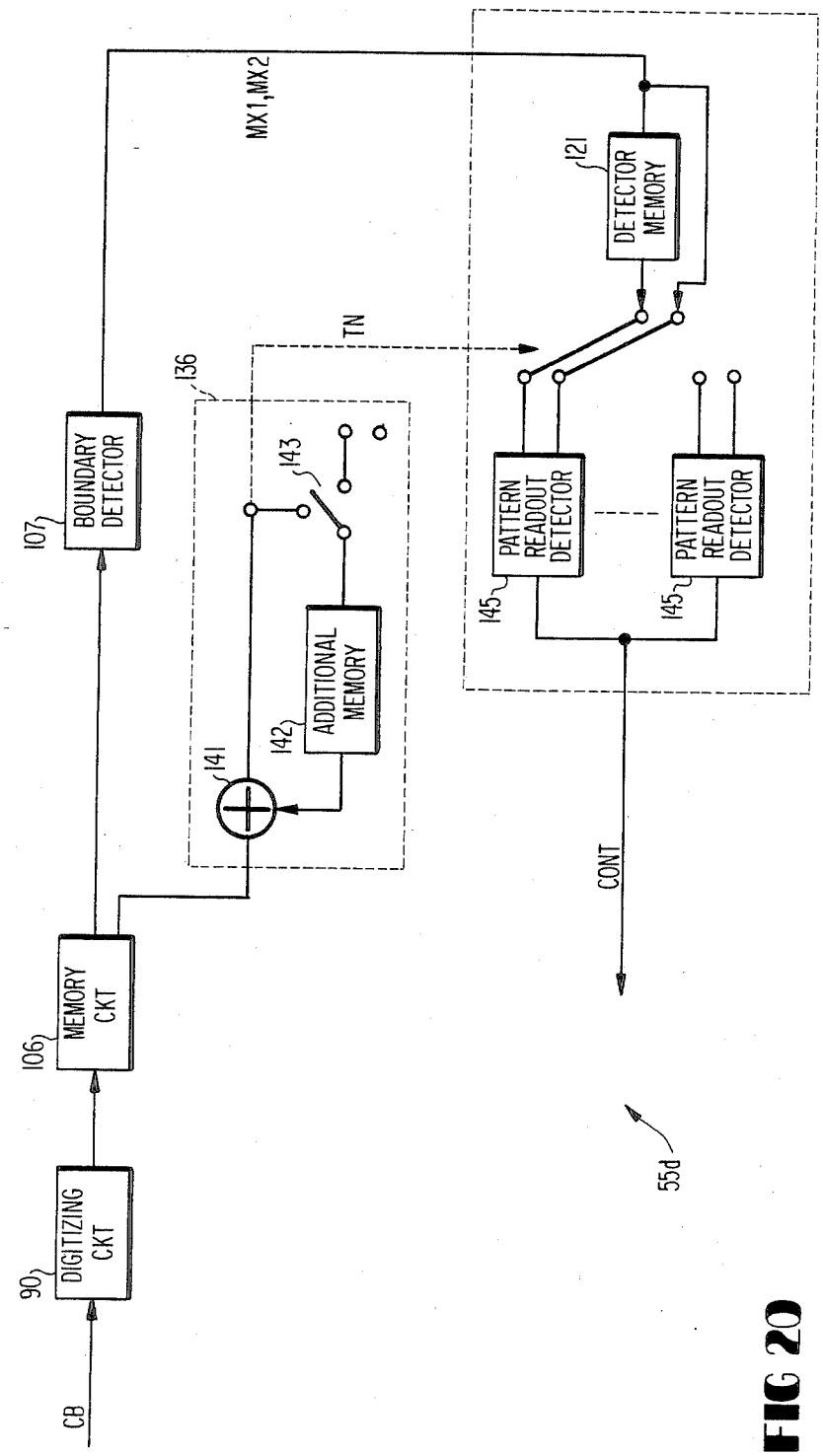
FIG. 20 shows a block diagram of a classification circuit of an encoder according to a seventh embodiment of this invention.

Referring to FIG. 20, an encoder according to a seventh embodiment of this invention comprises a classification circuit 55d comprising a digitizing circuit 90, a memory circuit 106, and a boundary detector 197, like in FIG. 18. In addition, the classification circuit 55d further comprises an accumulator 136 for calculating a total number of the digital coefficients at every coefficient block. To this end, the accumulator 136 is provided with an additional adder 141, an additional memory 142, and an additional switch 143. The additional switch 143 resets the additional memory 142 each time when the block end signal is supplied from the boundary detector 107 in a manner similar to that described in conjunction with FIG. 14.

In the accumulator 136, the digital coefficients are successively delivered from the memory circuit 106 to the additional adder 141. The digital coefficients are added to a content of the additional memory 142 when they take the logic "1" levels. As a result, a result of addition is supplied from the additional adder 136 to a pattern detector 144 as a total number signal TN representative of a total number of the significant digital coefficients included in each coefficient block.

The illustrated pattern detector 144 is supplied with the horizontal and the vertical maximum addresses MX1 and MX2 from the boundary detector 107 and comprises a plurality of pattern readout circuits which are collectively depicted at 145 and which store class number distributions different from one another. One of the pattern readout circuits 145 is selected by a selector 146 as an optimum pattern readout circuit in response to the total number signal TN. The optimum pattern readout circuit is supplied with the horizontal and the vertical maximum addresses MX1 and MX2 through the detector memory 121.

As a result, the class number is read out of the optimum pattern readout circuit in response to the horizontal and the vertical maximum addresses MX1 and MX2 and is produced as the control signal.

Figure 21:
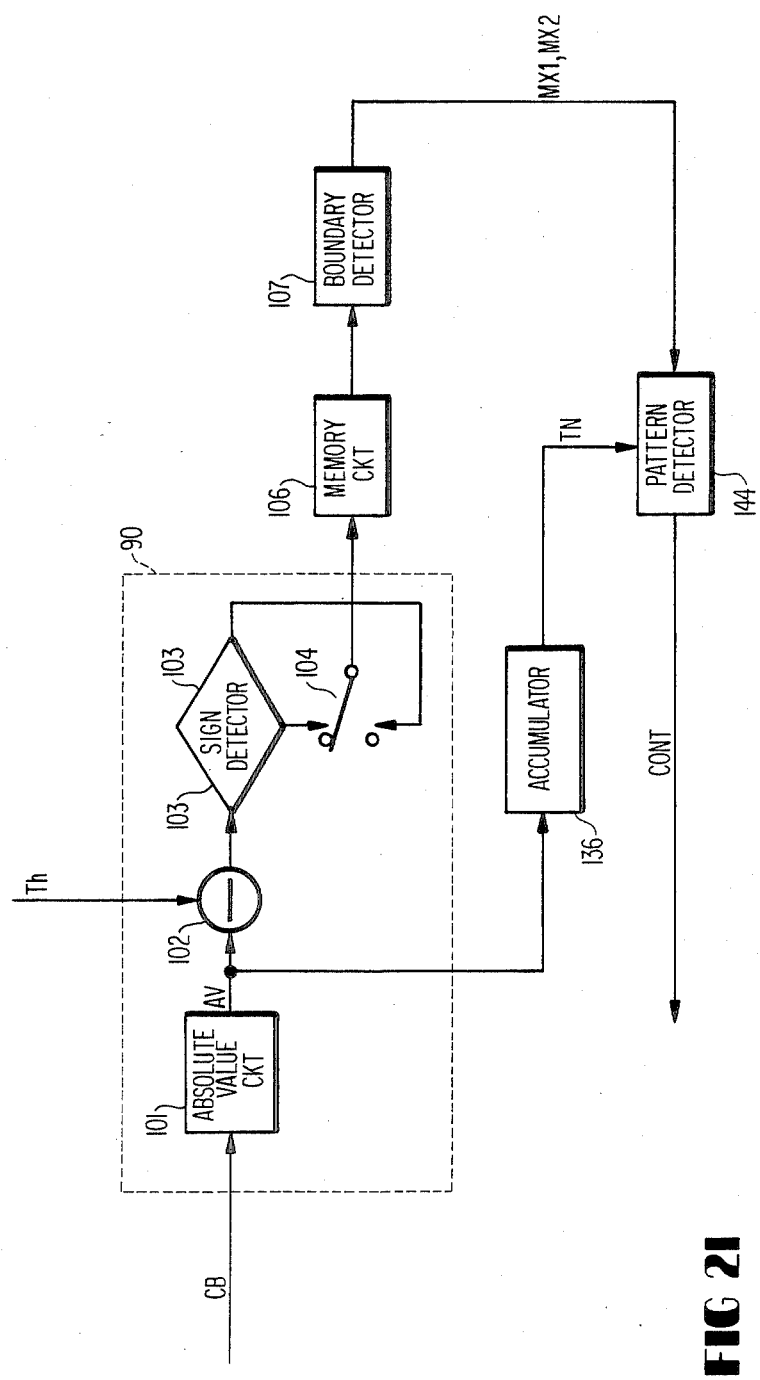
FIG. 21 shows a block diagram of a classification circuit of an encoder according to an eighth embodiment of this invention.

Referring to FIG. 21, an encoder according to an eighth embodiment of this invention is similar to that illustrated in FIG. 20 except that the accumulator 136 is coupled to the digitizing circuit 90 shown in FIG. 14. More particularly, the accumulator 136 is supplied with the absolute values (depicted at AV) of the coefficients from the absolute value circuit 101 identical with that illustrated in FIG. 14. Thus, it is possible for the accumulator to calculate the total number of the significant coefficients by monitoring the absolute values given from the absolute value circuit 101.

Supplied with the horizontal and the vertical maximum addresses MX1 and MX2 and the total number signal TN, the pattern detector 144 produces the class number as the control signal CONT in the manner described in conjunction with FIG. 20.

In the accumulator 136 illustrated in FIGS. 20 and 21, the additional adder 141 may be preceded by a signal converter (not shown) for converting an input signal into a logarithm signal or for converting the input signal into a power signal by calculating a square of the output signal. In this event, the total number signal TN is given as entropy of the coefficients or electric power thereof. Similar operation can be carried out by the use of such a total number signal TN.

Figure 22:
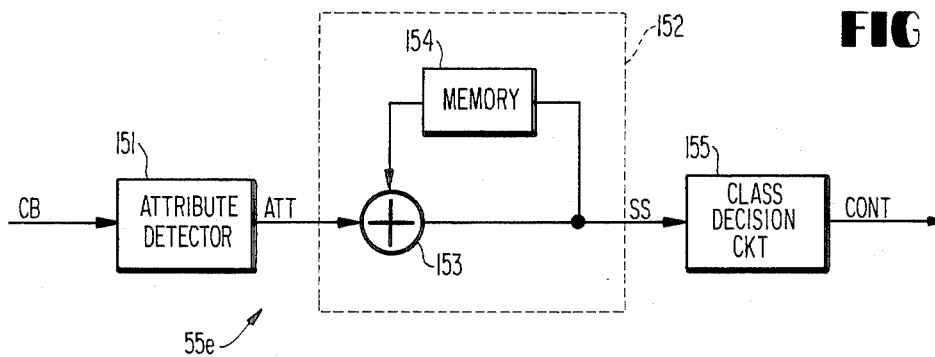
FIG. 22 shows a block diagram of a classification circuit of an encoder according to a ninth embodiment of this invention.

Referring to FIG. 22, an encoder according to a ninth embodiment of this invention is specified by a classification circuit 55e comprising an attribute detector 151 for detecting an attribute of the coefficients included in each coefficient block to produce a sequence of attribute signals ATT representative of the attribute in a manner to be described later. The attribute signal sequence ATT is accumulated by an accumulator 152 at every coefficient block. To this end, the accumulator 152 comprises an adder 153 and a memory 154. The attribute signals ATT are successively added to a content of the memory 154 during each coefficient block to produce a sum signal SS representative of a sum between the attribute signals ATT and the content of the memory 154. The sum signal SS is sent to a class decision circuit 155 which may be a code converter implemented by a read-only memory.

Let the illustrated class decision circuit 155 classify the sum signal SS into first through eighth classes when each coefficient block is composed of the coefficients of eight by eight. The sum signal SS is assumed to correspond to the number of the significant coefficients included in each coefficient block. In this event, the sum signal SS may represent six bits of digital signals while each class can specify three bits of the control signal CONT, as shown in Table 1.

TABLE 1

| Significant Coefficient Number | Class Number |
| --- | --- |
| 46–64 | 8 |
| 37–45 | 7 |
| 29–36 | 6 |
| 22–28 | 5 |
| 16–21 | 4 |
| 7–15 | 3 |
| 4–6 | 2 |
| 0–3 | 1 |

Figure 23:
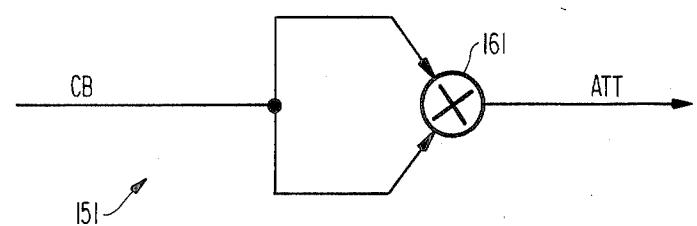
FIG. 23 shows a block diagram of a circuit for use in a part of the classification circuit illustrated in FIG. 22.

Referring to FIG. 23 together with FIG. 22, the attribute detector 151 is implemented by a multiplier 161 for calculating a square of each coefficient to produce electric power of each coefficient as the attribute signal ATT. Thus, the attribute of the coefficients can be specified by the power.

Figure 24:
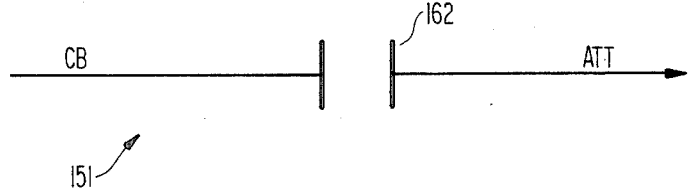
FIG. 24 shows a block diagram of another circuit for use in the part of the classification circuit illustrated in FIG. 22.

Referring to FIG. 24 in addition to FIG. 22, the attribute detector 151 may be formed by an absolute value calculator 162 for detecting absolute values of the coefficients included in each coefficient block CB to produce as the attribute signal absolute value signals representative of the absolute values. The attribute of the coefficients can be specified by the absolute values of the coefficients.

Figure 25:
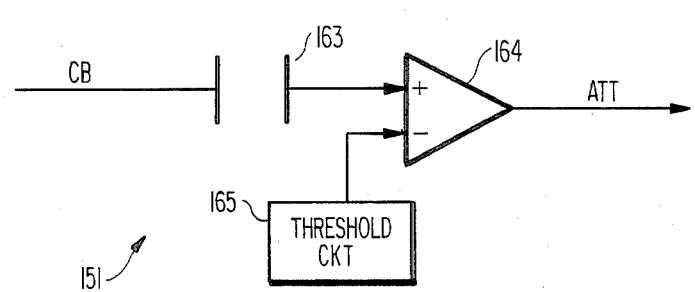
FIG. 25 shows a block diagram of a further circuit for use in the part of the classification circuit illustrated in FIG. 22.

Referring to FIG. 25 together with FIG. 22, the attribute detector 151 may also be given by a combination of an absolute value circuit 163, a comparator 164, and a threshold circuit 165. The coefficients of each coefficient block are sent through the absolute value circuit 163 to the comparator 164 in the form of absolute value signals. Each absolute value signal is compared by the comparator 164 with a threshold signal which is given from the threshold circuit 165 and which is representative of a threshold value. A result of comparison is successively produced as the attribute signal ATT. The illustrated attribute detector 151 detects whether or not each coefficient exceeds the threshold value, namely, each coefficient is significant. As a result, the attribute of each coefficient block can be represented by the number of significant ones of the coefficients.

While this invention has thus far been described in conjunction with about ten embodiments thereof, it will readily be possible for those skilled in the art to put this invention into practice in various other manners. For example, the classification may be carried out by a combination of the classification circuits 55 illustrated in FIGS. 18, 20, and 21. In FIG. 1, a combination of the coefficient reference table unit 62 and the switch 64 may be placed between the quantization and the code conversion units 60 and 61 and may be placed before the quantization unit 60. In addition, at least two of the quantization characteristics, the code conversion characteristics, and the coefficient selection characteristics may be selected by the control signal CONT, although selection is made about all of them in the embodiments. Each coefficient block may be rectangular.

What is claimed is:

1. An encoder for use in encoding a moving image into a sequence of encoded image codes in response to a sequence of coefficient blocks, each coefficient block being composed of a plurality of orthogonal transform coefficients resulting from orthogonal transform of predictive error signals which are produced by predictively coding a plurality of picture elements of said moving image at every picture block, said encoder comprising a quantization unit having a plurality of quantization characteristics, a code conversion unit having a plurality of code conversion characteristics, and a coefficient selection unit having a plurality of coefficient selection characteristics, each of said coefficient blocks being processed through said quantization unit, said code conversion unit, and said coefficient selection unit into said encoded image codes by selecting said quantization characteristics, said code conversion characteristics, and said coefficient selection characteristics, wherein the improvement comprises:
    classifying means responsive to said coefficient blocks for classifying each of said coefficient blocks into a selected one of statistically determined classes with reference to the orthogonal transform coefficients included in each of said coefficient blocks, to produce a control signal representative of said selected one of the classes; and
    delivering means for delivering said control signal to at least two of said quantization unit, said code conversion unit, and said coefficient selection unit to select at least two of said quantization characteristics, said code conversion characteristics, and said coefficient selection characteristics.

2. An encoder as claimed in claim 1, wherein said classes are statistically predetermined in relation to a selected one of a distribution of said orthogonal transform coefficients in said each coefficient block, power of said orthogonal transform coefficients in said each coefficient block, an amount of information of each coefficient block, and specific information characterizing each coefficient block.

3. An encoder as claimed in claim 1, wherein said quantization characteristics of said quantization unit are determined in relation to said classes and selected by said control signal.

4. An encoder as claimed in claim 1, wherein said code conversion characteristics are determined in relation to said classes and selected by said control signal.

5. An encoder as claimed in claim 1, wherein said coefficient selection characteristics are determined by said classes and selected by said control signal.

6. An encoder as claimed in claim 1, wherein said quantization characteristics, said code conversion characteristics, and said coefficient selection characteristics are selected by said control signal.

7. An encoder as claimed in claim 6, said quantization unit and said code conversion unit being connected in cascade with said quantization unit supplied with said each coefficient block, wherein said coefficient selection unit is connected after said code conversion unit to produce said encoded image codes through said coefficient selection unit.

8. An encoder as claimed in claim 1, wherein said quantization unit is operable in response to each coefficient block to produce a quantized block and comprises:
    a plurality of quantizers for individually quantizing said each coefficient block into preliminary quantized blocks in accordance with said quantization characteristics; and
    selecting means responsive to said control signal and coupled to said quantizers for selecting one of said quantizers that is indicated by said control signal to make said one of the quantizers produce one of said preliminary quantized blocks as said quantized block.

9. An encoder as claimed in claim 8, wherein each of said quantizers comprises:
    a plurality of quantizer elements responsive to said each coefficient block for individually quantizing said orthogonal transform coefficients into quantized coefficients;
    scanning means for scanning said quantizer elements one by one within said each coefficient block to successively derive said quantized coefficients in a time division fashion from said quantizer elements as a quantized coefficient sequence and to produce said quantized coefficient sequence as each of the preliminary quantized blocks.

10. An encoder as claimed in claim 9, wherein said code conversion unit is operable in response to said one of the quantized blocks to produce a code converted block and comprises:
    a plurality of code converters connected in parallel to one another and having said code conversion characteristics for converting said one of the quantized blocks into preliminary code converted blocks in parallel in accordance with said code conversion characteristics; and
    converter selection means coupled to said code converters and responsive to said control signal for selecting one of said preliminary code converted blocks as said code converted block.

11. An encoder as claimed in claim 10, wherein each of said code converters comprises:
- a plurality of converter elements connected in parallel to one another and responsive to said one of the quantized blocks for carrying out code conversion of said one of the quantized blocks to produce local code converted blocks in parallel; and
- additional selection means coupled to said converter elements for successively selecting said local code converted blocks one by one to produce each of said preliminary code converted blocks.

12. An encoder as claimed in claim 1, wherein said classifying means comprises:
- digitizing means responsive to said coefficient blocks for digitizing each of said coefficient blocks into a digital block;
- reference block producing means for producing a plurality of reference digital blocks corresponding to said classes;
- calculation means coupled to said digitizing means and said reference block producing means for calculating correlations between said digital block and said reference digital blocks;
- means coupled to said calculation means for detecting one of the reference digital blocks that has the highest one of the correlations to produce a detection signal representative of said one of the reference digital blocks, said one of the reference digital blocks corresponding to said selected class; and
- means for producing said detection signal as said control signal.

13. An encoder as claimed in claim 1, wherein said classifying means comprises:
- digitizing means responsive to said coefficient blocks for digitizing each of said coefficient blocks into a digital block composed of digital coefficients divisible into significant coefficients and insignificant ones;
- memory means coupled to said digitizing means for storing said digital coefficients of the digital block;
- boundary detecting means coupled to said memory means for detecting a boundary between said significant and said insignificant coefficients to produce a boundary position signal representative of a position of said boundary;
- class decision means coupled to said boundary detecting means for deciding said selected one of the classes to produce a class signal representative of said selected class; and
- means for producing said class signal as said control signal.

* * * * *